US012794247B2

(12) United States Patent
Walther et al.

(10) Patent No.: US 12,794,247 B2
(45) Date of Patent: Nov. 10, 2026

(54) BATTERY MANAGEMENT CIRCUITS WITH REDUNDANT POWER SUPPLY

(71) Applicant: Infineon Technologies AG, Neubiberg (DE)

(72) Inventors: Christian Walther, Munich (DE); Markus Ekler, Feldkirchen (DE)

(73) Assignee: Infineon Technologies AG, Neubiberg (DE)

( * ) Notice: Subject to any disclaimer, the term of this patent is extended or adjusted under 35 U.S.C. 154(b) by 780 days.

(21) Appl. No.: 18/318,516

(22) Filed: May 16, 2023

(65) Prior Publication Data

US 2024/0388107 A1 Nov. 21, 2024

(51) Int. Cl.

| | |
|---|---|
| ***H02J 7/56*** | (2026.01) |
| ***H02J 1/082*** | (2026.01) |
| ***H02J 7/34*** | (2006.01) |

(52) U.S. Cl.

CPC ................ *H02J 7/56* (2026.01); *H02J 1/082* (2020.01); *H02J 7/342* (2020.01); *H02J 2207/20* (2020.01)

(58) Field of Classification Search

CPC .... H02J 7/56; H02J 1/082; H02J 7/342; H02J 2207/20; B60L 58/10; H01M 10/425; H01M 2010/4271

USPC .......................................................... 320/116

See application file for complete search history.

(56) References Cited

U.S. PATENT DOCUMENTS

| | | | | |
|---|---|---|---|---|
| 2005/0052164 A1* | 3/2005 | Sakai | H02J 9/06 | 323/222 |
| 2009/0225571 A1* | 9/2009 | Eldery | H02M 7/53873 | 363/41 |
| 2013/0135904 A1* | 5/2013 | Murayama | H02M 3/33561 | 363/17 |
| 2015/0037656 A1* | 2/2015 | Noda | B60L 58/15 | 429/149 |
| 2016/0380443 A1* | 12/2016 | Jeon | H02J 7/52 | 320/112 |
| 2017/0229902 A1* | 8/2017 | Kamikawa | H01M 10/4207 | |
| 2023/0048191 A1* | 2/2023 | Li | H02J 7/54 | |

OTHER PUBLICATIONS

"TLE9012DQU: Li-ion battery monitoring and balancing IC", Infineon Technologies AG, Retrieved from: https://www.infineon.com/cms/en/product/battery-management-ics/tle9012dqu/, Jan. 24, 2022, 76 pp.

* cited by examiner

*Primary Examiner* — Huy Q Phan

(74) *Attorney, Agent, or Firm* — Shumaker & Sieffert, P.A.

(57) ABSTRACT

In some examples, this disclosure describes a method of operating a battery management circuit of a battery management system associated with an electric device. The method may comprise supplying power to the battery management circuit from battery cells being monitored by the battery management circuit in a first instance of time; and suppling power to the battery management circuit from a DC/DC power converter in a second instance of time.

19 Claims, 4 Drawing Sheets

BATTERY MANAGEMENT CIRCUITS WITH REDUNDANT POWER SUPPLY

TECHNICAL FIELD

This disclosure relates to battery management circuits for electric vehicles or other battery powered devices.

BACKGROUND

Battery powered devices, such as electric vehicles, often include many battery cells connected in series to form a battery system for the battery powered device. For such battery systems, battery management systems (BMSs) are often used for battery cell monitoring, thermal monitoring, cell balancing of battery cells, or other battery management functions.

High voltage BMSs, such as those used for electric vehicles, often use several different battery management circuits in order to monitor all of the battery cells of a battery powered device. For example, each of the battery management circuits may monitor a subset of the battery cells of a battery system that is used to provide power to a battery powered device. Battery management circuits may be capable of monitoring voltages and temperatures of several cells and may perform cell balancing or other battery management functions on the different battery cells. The number of channels for each battery management circuit, however, may be limited, and therefore, several battery management circuits may be needed within a BMS in order to monitor all of the cells of a battery system.

For example, an electrical vehicle may include a battery system with one hundred or more battery cells connected in series, but battery management circuits may include a more limited number of channels, e.g., only twelve or eighteen channels. In the case of twelve channels, nine battery management circuits may be needed within a BMS to monitor all one hundred cells of the battery system. Of course, the number of cells used in a given battery system can vary, and the number of channels in each battery management circuit can also vary.

SUMMARY

In general, this disclosure is directed to battery cell management circuits, and systems and circuits that use a plurality of battery management circuits to manage a plurality of battery cells in a battery powered system, such as in an electric vehicle. The battery cell management circuits of this disclosure are supplied by power from two different power domains. A first power domain may comprise a high-voltage power domain associated with the battery cells that are being monitored, and power from the first power domain may be regulated by a linear regulator circuit. A second power domain may comprise a low voltage power domain that includes a DC/DC power converter to regulate the power. The two different power domains provide redundancy to the system. Moreover, according to the techniques of this disclosure, the different power domains can be selected and used at specific times so as to provide advantages and efficiencies to the operation of the circuits and system.

In some examples, this disclosure describes a battery cell management circuit configured to manage a plurality of battery cells. The battery cell management circuit may comprise a first connection to a first power supply, wherein the first power supply comprises the plurality of battery cells, and a second connection to a second power supply, wherein the second power supply comprises a DC/DC power converter.

In other examples, this disclosure describes a circuit that comprises N battery cell management circuits configured to manage a plurality of battery cells, wherein N is an integer, wherein each of the N battery cell management circuits comprises a first connection to a first power supply, and wherein the first power supply comprises the plurality of battery cells. The circuit may also comprise a second power supply comprising a DC/DC power converter, wherein each of the N battery cell management circuits comprises a second connection to the second power supply. Moreover, the circuit may comprise N rectifier circuits connected to the N battery cell management circuits, and a transformer that connects the DC/DC power converter to the N rectifier circuits, wherein the N battery cell management circuits are configured to receive power from the first power supply in a first instance of time and to receive power from the second power supply via the transformer and the N rectifier circuits in a second instance of time.

In some examples, this disclosure describes a system comprising a plurality of battery cells, and N battery cell management circuits configured to manage the plurality of battery cells, wherein N is an integer, wherein each of the N battery cell management circuits comprises a first connection to a first power supply, and wherein the first power supply comprises the plurality of battery cells. The system may also include a second power supply comprising a DC/DC power converter, wherein each of the N battery cell management circuits comprises a second connection to the second power supply. Moreover, the system may further include N rectifier circuits connected to the N battery cell management circuits, and a transformer that connects the DC/DC power converter to the N rectifier circuits, wherein the N battery cell management circuits are configured to receive power from the first power supply in a first instance of time and to receive power from the second power supply via the transformer and the N rectifier circuits in a second instance of time. The system may also include a controller circuit that is configured to control the DC/DC power converter.

In some examples, this disclosure describes a method of operating a battery management circuit of a battery management system associated with an electric device, wherein the method comprises supplying power to the battery management circuit from battery cells being monitored by the battery management circuit in a first instance of time, and suppling power to the battery management circuit from a DC/DC power converter in a second instance of time.

Details of these and other examples are set forth in the accompanying drawings and the description below. Other features, objects, and advantages will be apparent from the description and drawings, and from the claims.

DETAILED DESCRIPTION

Figure 1:
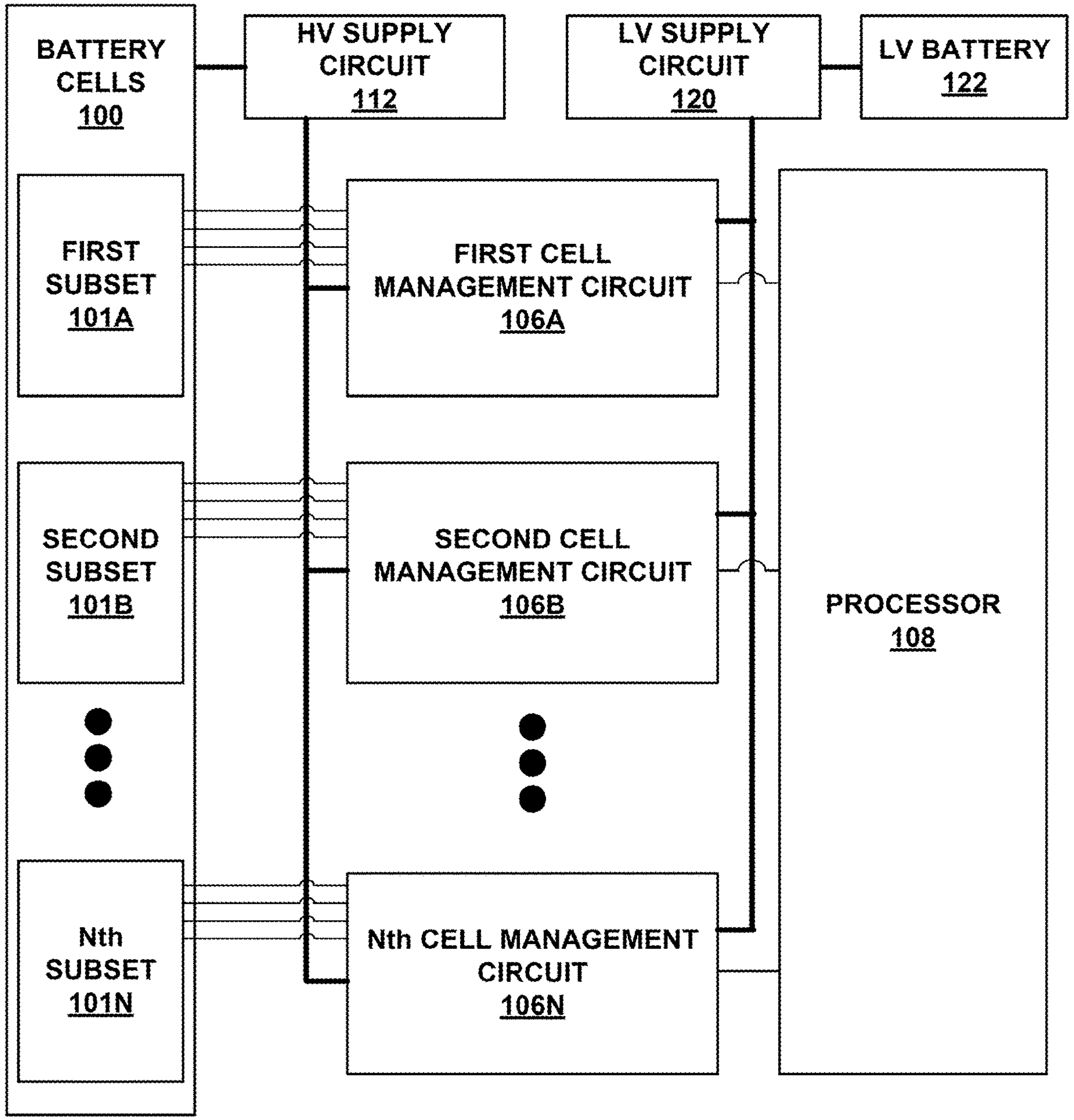
FIG. 1 is a block diagram battery cells and a battery monitoring system (BMS) that includes a supply circuit, a processor, and a plurality of battery cell management circuits.

This disclosure is directed to battery cell management circuits, and systems and circuits that use a plurality of battery management circuits (also called "battery cell management circuits) to manage a plurality of battery cells in a battery powered system, such as in an electric vehicle. The battery cell management circuits of this disclosure are supplied by power from two different power domains. A first power domain may comprise a high-voltage power domain associated with the battery cells that are being monitored, and power from the first power domain may be regulated by a linear regulator circuit. A second power domain may comprise a low voltage power domain that includes a DC/DC power converter to regulate the power. The two different power domains provide redundancy to the system. Moreover, according to the techniques of this disclosure, the different power domains can be selected and used at specific times so as to provide advantages and efficiencies to the operation of the circuits and system.

Battery management circuits may be configured to monitor charge levels (e.g., cell voltage levels) and temperatures of several different battery cells, and these circuits may be configured to perform cell balancing or other battery management functions on battery cells within a BMS. A BMS associated with an electric device, such as an electric vehicle, may include several battery management circuits in order to monitor different subsets of a plurality of battery cells used by the electric device. In addition to monitoring and balancing the charge levels of different battery cells, it may also be desirable to match current consumption among different battery cell management circuits within a BMS.

In BMS systems, battery management circuits may receive power from the battery cells that are being monitored. However, battery management circuits may operate a much lower voltages than the high-voltage power domain associated with the battery cells. Therefore, a regulator (e.g., a linear regulator) may be used to regulate the power from the battery cells to a lower voltage level that is appropriate for the battery management circuits. This regulation, however, can be very inefficient due to the large step down in voltage levels that are needed from the high voltage domain to the low voltage domain.

For this reason, this disclosure provides an alternative way to power the battery management circuits, i.e., by using DC/DC power converter that operates in the low voltage domain associated with the vehicle. The DC/DC power converter operating in the low voltage domain associated with the vehicle may deliver power to the battery management circuits in a manner that is much more efficient than using power from the battery cells themselves. However, it may be inefficient and undesirable to operate the DC/DC power converter at all times, for periodic low-power checks battery parameters. Therefore, periodic low-power checks battery parameters can be performed by battery management circuits using power from the first power domain (e.g., the battery cells themselves). Then, if based on the low-power checks on battery parameters, a battery management circuit determines that additional battery management functions are needed, e.g., for cell balancing or thermal balancing, then that circuit may send a wake-up signal to cause the DC/DC power converter to be enabled. Thereafter, the DC/DC power converter may supply the battery management circuit and the battery management circuit may perform the battery management functions in a power-efficient manner.

Thus, by using power from the battery stack in a first instance of time, e.g., for checking battery parameters, and then using power from the DC/DC power converter in a second instance of time, e.g., for cell balancing, thermal balancing or other cell management functions, the system can be improved. A plurality of battery management circuits may communicate via a daisy chain with a controller of the DC/DC power converter to facilitate control over the efficient delivery of power.

In some examples of this disclosure, regulating from a high cell input voltage down to the LV supply for the BMS IC has a very bad efficiency, which based on simulations, may be less than 50% power efficiency or less than 30% power efficiency. In contrast, a DC/DC power converter operating in the low voltage domain typically has power efficiency of 75-95%. In some examples, power consumption in low power operating mode of the vehicle, such as a parking mode may be in a range of 0.5-1 mW. e.g., 0.8 mW. Power consumption in a driving mode may be between 450 mW and 500 mW, such as approximately 480 mW with peak current consumption up to 20-30 mA.

FIG. 1 is a block diagram showing battery cells and a battery management system (BMS) that includes a high-voltage (HV) supply circuit 112 and a battery management circuits 106A, 106B, 106N to monitor battery cells 100. Battery cells 100 may comprise a set of battery cells connected in series. HV supply circuit 112 may comprise a linear regulator uses power from battery cells 100 to supply electrical current to battery management circuits. However, the power from battery cells 100 may only be used during low power modes, e.g., during periodic low-power wake-ups from a sleep mode, in order to check on battery parameters associated with battery cells 100. If, based on checking the battery parameters, a battery management circuit 106A, 106B, or 106N determines that battery management functions are needed, such as cell balancing or thermal balancing, then that battery management circuit 106A, 106B, or 106N switches to a second power supply. The second power supply may comprise a low voltage (LV) supply circuit 120 that receives power from a LV battery 122. As described in greater detail below, LV supply circuit 120 may comprise a direct current (DC)-to-DC power converter. Again, by using power from battery cells 100 and HV supply circuit 112 for cell checking and then using power from LV battery 122 and LV supply circuit 120 for battery management functions, power efficiencies can be achieved, and system performance may be improved.

In general, the low voltage power domain and the high voltage power domain are relative to one another, e.g., the low voltage domain operates at a lower voltage than the high voltage power domain. For example, in electric vehicles, the low voltage domain associated with LV battery 122 and LV supply circuit 120 may operate at less than 20 volts, e.g., 12 or 18 volts. In contrast, battery cells 100 may operate in a high voltage domain that is greater than 300 volts. These voltage values, however, are merely examples and the techniques of this disclosure may apply to any high voltage and low voltage domains that are different from one another.

Each of battery management circuits 106A, 106B, 106N may be configured and arranged to monitor a different subset of battery cells. For example, as illustrated in FIG. 1, a first battery management circuit 106A is arranged to monitor a first subset 101A of battery cells 100, and a second battery management circuit 106B is arranged to monitor a second subset 101B of battery cells 100. More generally, battery management circuit 106N is arranged to monitor an Nth subset 101N of battery cells 100. In this example, N may be any integer, within N usually being greater than 2. In other words, a BMS may include any number of battery cells and any number of battery cell management circuits.

Battery management circuits 106A, 106B, 106N may be connected to a processor 108, e.g., an external microprocessor. Processor 108 may comprise a BMS system-level processor, or possibly a higher system-level processor of an electric vehicle or other device. In some examples, processor 108 may operate in the low voltage domain (e.g., 12 or 18 volts) and battery cells 100 and battery management circuits 106A, 106B, 106N may operate in a high voltage domain (e.g., greater than 300 volts). In this case, a galvanic isolation barrier may exist between processor 108 and battery management circuits 106A, 106B, 106N to protect processor 108 from the high voltage domain. The galvanic isolation barrier may comprise an electrical transformer, such as stacked coils formed on printed circuit board, or a so-called coreless transformer. In other examples, galvanic isolation barrier may comprise one or more capacitors arranged to provide galvanic isolation to the different sides of the capacitors. Other galvanic isolation techniques may also be used.

In some examples, as discussed in greater detail below, galvanic isolation may be achieved via a transformer that comprises a primary coil connected to the DC/DC power converter and N secondary coils associated with rectifiers for each of the N cell management circuits 106A, 106B, 106N. For example, the transformer may comprise two or more planar coils formed on one or more printed circuit boards (PCBs).

Figure 2:
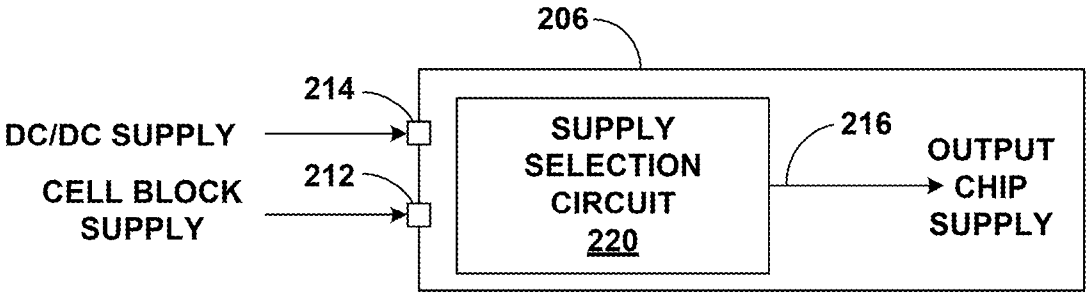
FIG. 2 is a block diagram of a battery management circuit with two different supplies.

FIG. 2 is a block diagram of a battery management circuit 206 that is configured to be connected to two different supplies. Battery management circuit 206 may correspond to any of battery management circuits 106A, 106B, 106N. Battery management circuit 206 includes a first input pin 212 connected to a cell block supply and a second input pin 214 connected to a DC/DC power converter supply. A supply selection circuit 220 is configured to selected between these two different supply domains and output a chip supply signal 216, e.g., corresponding to either the DC/DC supply on second pin 214 or the cell block supply on first pin 212. Not only does circuit 206 have redundancy in terms of its power supply, which is desirable, but circuit 206 may be configured to select its supply for different steps of the cell monitoring process. For example, according to this disclosure, supply selection circuit 220 may be configured to select cell block supply on first pin 212 for periodic checks on the voltage level of a battery cell. Such periodic checks may occur in a first instance of time that follows a sleep mode. Power from cell block supply on first pin 212 may be used to cause a brief "wake" from sleep mode into a low-power mode, which is merely for checking on the status of battery parameters, such as temperature or voltage level. If battery management functions are needed, e.g., as determined based on one of the periodic checks, then supply selection circuit 220 may then select DC/DC supply on second pin 214 in a second instance of time following the first instance of time. In this case, battery management circuit 206 may switch from the low power mode in the first instance of time to a full power mode in the second instance of time, e.g., in response to a determination performed by battery cell management circuit 206 in the low power mode.

The full power mode of a battery cell management circuit may demand more power than the low power mode of the battery cell management circuit, and the full power mode may receive its power from first pin 212 via the DC/DC supply. Battery management functions, such as cell voltage balancing or thermal balancing between cells or cell modules, may be performed in the full power mode. In some examples, these battery management functions may be avoided in the low power mode of the battery cell management circuit. In this way, cell block supply on first pin 212 is used for periodic low power checks, and if voltage or temperature balancing is desired, DC/DC supply on second pin 214 can be used to operate battery cell management circuit 206 in its full power mode in order to facilitate the more power intensive battery cell management operations. The DC/DC supply on second pin 214, for example, may be configured to deliver a precise regulated voltage level (e.g., stepped up or stepped down) relative to a battery voltage (e.g., that of LV battery 122 shown in FIG. 1).

In some examples, battery cell management circuit 206 is configured to manage a plurality of battery cells (e.g., a subset of a larger plurality that forms a battery stack). Again, battery cell management circuit 206 comprises a first connection (e.g., first pin 212) to a first power supply, wherein the first power supply comprises the plurality of battery cells. Battery cell management circuit 206 also comprises a second connection (e.g., second pin 214) to a second power supply, wherein the second power supply comprises a DC/DC power converter.

The first power supply and the second power supply comprise different power supply domains, wherein the first power supply comprises a high voltage power supply domain and the second power supply comprises a low voltage power supply domain, and wherein the low voltage power supply operates at a voltage level that is lower than that of the high voltage power supply. Moreover, the low voltage power supply domain and the high voltage power supply domain may be galvanically isolated from one another, such as by using a transformer for the connection to the DC/DC power converter.

In some examples, the first connection (e.g., first pin 212) receives first power from a linear regulator that regulates the power from the battery cells, and the second connection (e.g., second pin 214) receives second power from a rectifier circuit connected to a secondary coil of a transformer, wherein the DC/DC power converter is connected to a primary coil of the transformer. Additional details of the rectifier and coiled transformer are discussed below in relation to FIG. 3.

In some examples, battery cell management circuit 206 further comprises a communication connection (not shown in FIG. 2 but discussed below with regard to FIG. 3). The communication connection may be configured to operate according to a daisy chain protocol, wherein the communication connection connects the battery management circuit 206 to other battery management circuits and to a receiver circuit associated with a processor, and wherein the processor is configured to control the DC/DC power converter.

Figure 3:
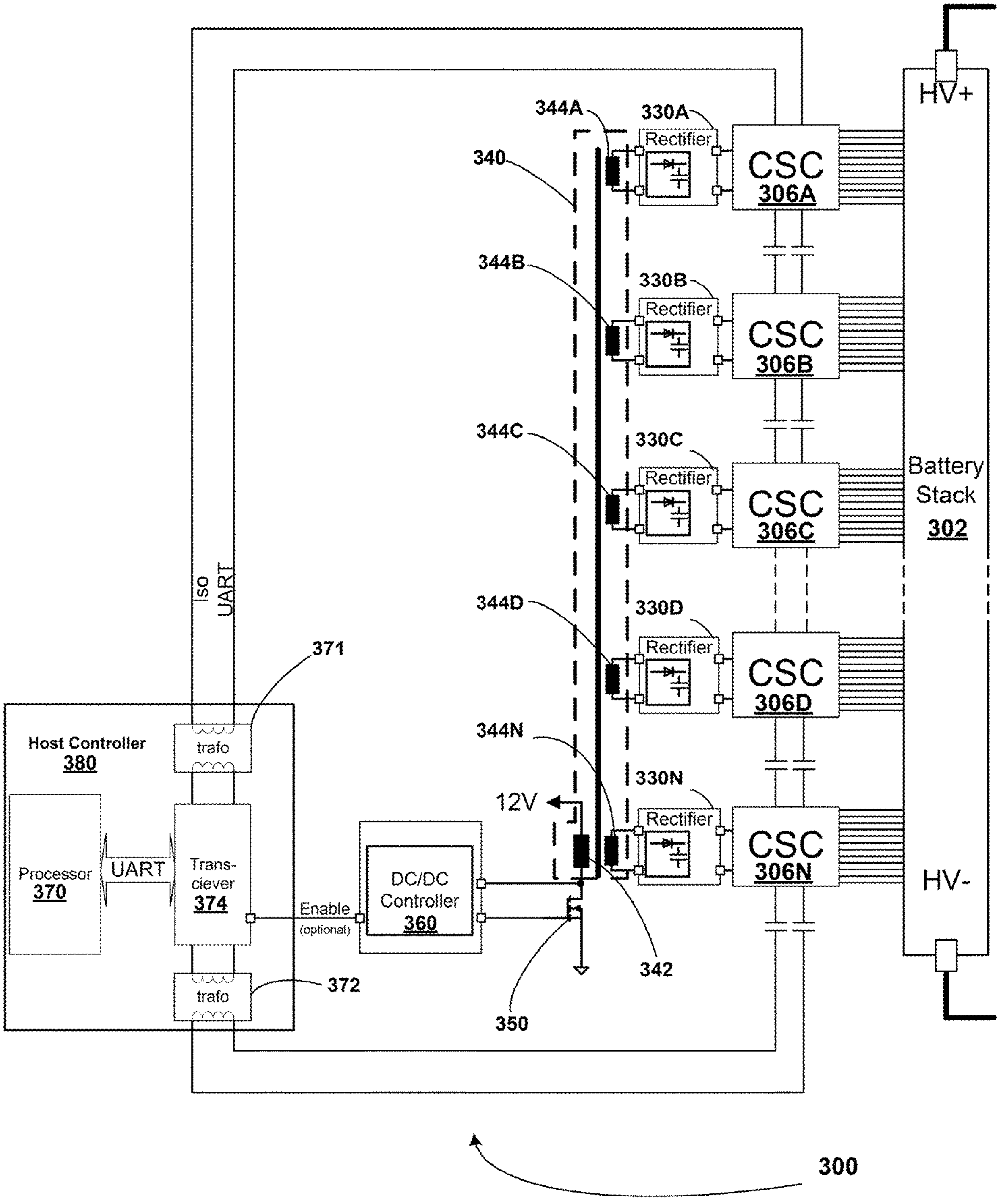
FIG. 3 is a block diagram showing another depiction of an example BMS.

FIG. 3 is a block diagram showing another depiction of an example BMS 300 connected to a battery stack 302. Battery stack 302 may comprise a plurality of battery cells connected in series. Different subsets of the battery cells are monitored by battery management circuits 306A, 306B, 306C, 306D, 306N (collectively referred to as battery management circuits 306). Battery management circuits 306 are sometimes referred to as cell sensor circuits (CSCs) and are labeled as such in FIG. 3.

Consistent with this disclosure, a circuit may comprise N battery cell management circuits 306 configured to manage a plurality of battery cells, wherein N is an integer. Each of the N battery cell management circuits 306 comprises a first connection to a first power supply (e.g., to battery stack 302 that comprises the plurality of battery cells). The circuit shown in FIG. 3 may also comprise a second power supply (e.g., a DC/DC power converter), wherein each of the N battery cell management circuits 306 comprises a second connection to the second power supply. The DC/DC power converter, for example, may comprise DC/DC controller 360, and a power switch 350 connected to a transformer 340. DC/DC controller 360 controls the ON/OFF state of power switch 350 to control power delivery via the DC/DC power converter. In some examples, transformer 340 may comprise a stand-alone device, such as a planar PCB transformer.

As further shown in FIG. 3, a circuit may further include N rectifier circuits 330A, 330B, 330C, 330D, 330N connected to the N battery cell management circuits 306A, 306B, 306C, 306D, 306N. Rectifier circuits 330A, 330B, 330C. 330D, 330N may each comprise a diode connected to a capacitor (as illustrated) although other types of rectifier circuits could be used to rectify power from a DC/DC power converter.

Transformer 340 connects the DC/DC power converter (e.g., the output of power switch 350) to the N rectifier circuits 330A, 330B, 330C, 330D, 330N. According to this disclosure, the N battery cell management circuits 330A, 330B, 330C, 330D, 330N are configured to receive power from the first power supply (e.g., from battery stack 302) in a first instance of time and to receive power from the second power supply (e.g., from the DC/DC power converter) via transformer 340 and the N rectifier circuits 330A, 330B, 330C. 330D, 330N in a second instance of time.

In the example shown in FIG. 3, transformer 340 may comprise a primary coil 342 connected to the DC/DC power converter (e.g., connected to the output of power switch 350). Transformer 340 may also comprise N secondary coils 344A, 344B, 344C. 344D, 344N connected to the N rectifier circuits 330A, 330B, 330C, 330D, 330N. In some examples, transformer 340 comprises two or more planar coils formed on one or more PCBs. Again, "N" represents a positive integer and, for example, may represent a plurality greater than 2. N may refer to the number of battery management circuits 306, and the corresponding number of rectifiers 330 and secondary coils 344. In some examples N is greater than 10.

Each of the N battery cell management circuits 306 may be configured to: operate in a sleep mode; operate in a low power mode in a first instance of time following the sleep mode, wherein each of the N battery cell management circuits 306 receives first power from the first power supply (e.g., battery stack 302) in the first instance of time; and operate in a full power mode in a second instance of time following the first instance of time, wherein each of the battery cell management circuits 306 receives second power from the second power supply (e.g., from the DC/DC power converter) in the second instance of time. Thus, in some examples, each of the N battery cell management circuits 306 is configured to operate in the full power mode in response to a determination by a respective one of the N battery cell management circuits 306 in the low power mode.

In some examples, a system as shown in FIG. 3 includes a plurality of battery cells (e.g., battery stack 302), and the N battery cell management circuits 306 configured to manage the plurality of battery cells, wherein N is an integer, wherein each of the N battery cell management circuits comprises a first connection to a first power supply, wherein the first power supply comprises the plurality of battery cells (e.g., battery stack 302). The system also includes a second power supply comprising a DC/DC power converter, wherein each of the N battery cell management circuits comprises a second connection to the second power supply. The DC/DC power converter may comprise DC/DC controller 360 and power switch 350, which is connected to transformer 340. N rectifier circuits 330 connected to the N battery cell management circuits 306, and transformer 340 connects the DC/DC power converter to the N rectifier circuits 330, wherein the N battery cell management circuits are configured to receive power from the first power supply (e.g., battery stack 302) in a first instance of time and to receive power from the second power supply (e.g., a DC/DC power converter defined by elements 360 and 350) via transformer 340 and the N rectifier circuits 330 in a second instance of time. A controller circuit (e.g., host controller 380) may be configured to control the DC/DC power converter by controller DC/DC controller 360 to define the ON/OFF state of power switch 350.

In some examples, the N battery cell management circuits 306 each comprise a communication connection configured to operate according to a daisy chain protocol. In particular, the communication connections among battery cell management circuits 306 may connect each of the N battery management circuits 306 in a daisy chain to host controller 380. The daisy chain may comprise a ring network that includes the N battery management circuits 306 and host controller 380, e.g., communicating according to an international standards organization (ISO) universal asynchronous receiver-transmitter (UART) protocol. Host controller 380 may include a receiver (e.g., transceiver 374) that is part of the ring network and host controller 380 may also include a processor 370 connected to the receiver (e.g., transceiver 374), wherein processor 370 is configured to control the DC/DC power converter by controlling DC/DC controller 360 to define the ON/OFF state of power switch 350. For daisy chain communication with each of the N battery management circuits 306, host controller 380 may also include additional transformer coils 371 and 372 on the sending and receiving sides of host controller 380 to maintain galvanic isolation between host controller 380 and battery management circuits 306.

Processor 370 may be configured to communicate via transceiver 374 via the UART protocol, e.g., to facilitate communication with the N battery management circuits 306 over the ring network using a daisy chain approach. In some examples, at the direction of processor 370, transceiver 374 may be configured to communicate an optional "enable" signal to DC/DC controller 360, e.g., to wake up DC/DC controller 360 when needed. The DC/DC power converter or each of the N battery management circuits 306 may comprise DC/DC controller 360, power switch, and transformer 340 connected to a respective rectifier circuit 330A, 330B, 330C, 330D, or 330N. Again, transformer 340 may comprise a primary coil 342 connected to the DC/DC power converter (e.g., connected to the output of power switch 350), and N secondary coils 344A, 344B, 344C, 344D, 344N connected to the N rectifier circuits 330A, 330B, 330C, 330D, 330N. Other types of transformers could also be used, but the configuration shown in FIG. 3 has advantages insofar as only one primary coil 342 is used with several secondary coils 344A, 344B, 344C, 344D, 344N connected to the N rectifier circuits 330A, 330B, 330C. 330D, 330N, thereby eliminating the need for a plurality of primary coils.

Each of battery management circuits 306 may operate according to a process that uses two different power supply domains at different points in time of the process. A battery management circuit may operate in sleep mode, but the battery management circuit may "wake" periodically into a low power mode using power from battery stack 302 to perform a check on battery parameters of the cells it is monitoring. If cell balancing or thermal balancing (or another battery management function) is desired based on a battery parameter check determination, then that battery management circuit sends a wake up signal (via daisy chain communication through battery management circuits 306 to host controller 380), which wakes up DC/DC controller 360 to cause power to be supplied to battery management circuits 306 in a full power mode via the DC/DC power converter. In this way, battery stack 302 is still used for the low power step of periodic checking on the parameters of the cells within battery stack 302 without any need to enable and power up DC/DC power converter 360 unless more complicated battery management functions are desired. If more complicated battery management functions are desired, then DC/DC controller 360 is powered up and the DC/DC power converter supplies the power to battery management circuits 306 in the full power mode.

In some examples, this disclosure describes a method of operating a battery management circuit (e.g., one of circuits 106 or 306) of a battery management system associated with an electric device. The method may comprise supplying power to the battery management circuit (e.g., one of circuits 106 or 306) from battery cells being monitored by the battery management circuit in a first instance of time; and supplying power to the battery management circuit from a DC/DC power converter in a second instance of time.

More specifically, the method may include operating the battery management circuit (e.g., one of circuits 106 or 306) in a sleep mode; supplying power to the battery management circuit (e.g., one of circuits 106 or 306) from battery cells being monitored by the battery management circuit in the first instance of time that corresponds to a low power mode following the sleep mode; checking one or more parameters of the battery cells in the low power mode; sending a wake-up signal from the battery management circuit (e.g., one of circuits 106 or 306) to a controller circuit (e.g., host controller 380 or processor 102) in response to a determination based on the one or more parameters of the battery cells in the low power mode; supplying power to the battery management circuit (e.g., one of circuits 106 or 306) from the DC/DC power converter in the second instance of time that corresponds to a full power mode following the low power mode in response to the wake-up signal; and performing one or more battery cell management functions during the full power mode.

In some examples, the low power mode (powered by the battery stack) is used to measure individual quantities associated with one or more battery cells, such as voltage or temperature. Moreover, in some examples, the full power mode (powered by the DC/DC power converter) is used to cause changes to those individual quantities in different battery cells, e.g., by performing thermal balancing or cell voltage balancing between different cells or different sets of cells.

Figure 4:
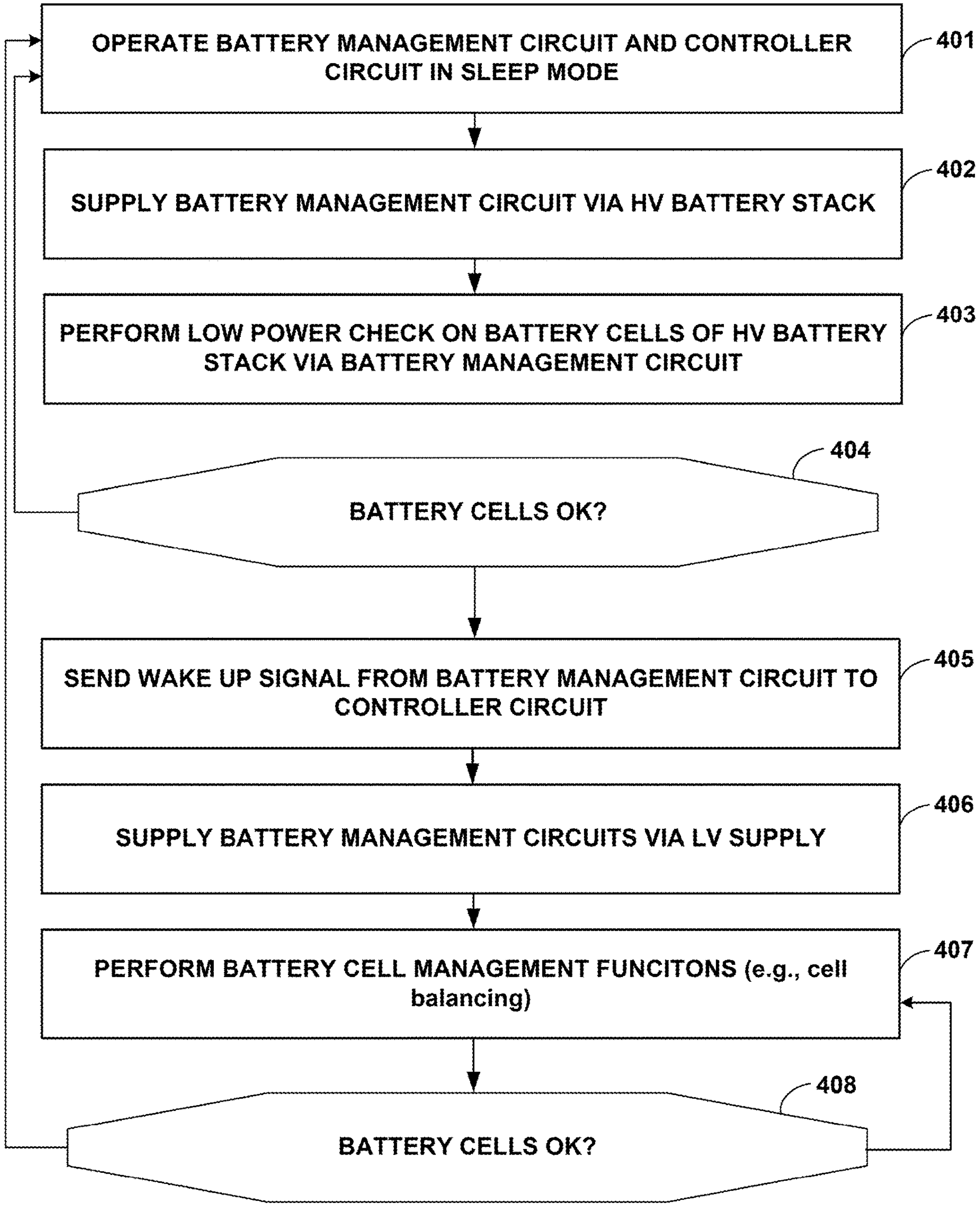
FIG. 4 is a flow diagram consistent with techniques of this disclosure.

FIG. 4 is a flow diagram consistent with one or more examples of this disclosure. FIG. 4 will be described from the perspective of the system shown in FIG. 3, although other circuits or systems may perform the method. As shown in FIG. 4, battery management circuits 306 and host controller 380 may operate in a sleep mode (401), in which little or no power is consumed. Then, periodically one or more battery management circuits 306 are supplied with power from battery stack 302 (402), and the one or more battery management circuits 306 perform a low power check on the status of one or more battery cells in battery stack 302 (403). This process (i.e., steps 401-403) repeats periodically as long as the battery cells are determined to be OK (yes branch of 404).

However, upon determining that one or more parameters associated with one or more battery cells in stack 302 are not OK (no branch of 404), a battery management circuit (e.g., one of circuits 306) sends a wake-up signal to host controller 380 (405), e.g., via a daisy chain communication signal through other one of circuits 306 to transceiver 374 of host controller 380. Host controller 380 wakes up DC/DC controller 360 to control power switch 350 and thereby, causes power to be supplied to battery management circuits 306 via a LV supply (406), e.g., via the DC/DC power converter output of power switch 350. At this point, battery management circuits 306 may be configured to operate in full power mode based on power from the DC/DC power converter. Accordingly, battery management circuits 306 may then perform battery cell management functions (such as cell voltage balancing, thermal balancing, current consumption balancing, or other functions) in the presence of full power being supplied by the DC/DC power converter. Once the battery cells are balanced and OK (yes branch of 408), the system re-enters sleep mode (401), and the process of FIG. 4 may repeat.

By using the described concepts, the battery management system may be able to:

1. reduce total power consumption while still be able to wake-up in case the low voltage control elements are in sleep mode;
2. reduce the thermal stress on the CSCs; and
3. use a redundant supply that can help to harmonize the temperature gradients without requiring excessive power consumption.

The techniques described in this disclosure may be implemented, at least in part, in circuitry, hardware, software, firmware or any combination thereof. For example, various aspects of the described techniques may be implemented within one or more logical elements, processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

It may also be possible for one or more aspects of this disclosure to be performed in software, in which case those aspects of the techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, or other computer readable media.

The following clauses may illustrate one or more aspects of the disclosure.

Clause 1—A battery cell management circuit configured to manage a plurality of battery cells, the battery cell management circuit comprising: a first connection to a first power supply, wherein the first power supply comprises the plurality of battery cells; and a second connection to a second power supply, wherein the second power supply comprises a DC/DC power converter.

Clause 2—The battery cell management circuit of clause 1, wherein the first power supply and the second power supply comprise different power supply domains, wherein the first power supply comprises a high voltage power supply domain and the second power supply comprises a low voltage power supply domain, and wherein the low voltage power supply operates at a voltage level that is lower than that of the high voltage power supply.

Clause 3—The battery cell management circuit of clause 2, wherein the low voltage power supply domain and the high voltage power supply domain are galvanically isolated.

Clause 4—The battery cell management circuit of any of clauses 1-3, wherein the first connection receives first power from a linear regulator that regulates the first power supply; and wherein the second connection receives second power from a rectifier circuit connected to a secondary coil of a transformer, wherein the DC/DC power converter is connected to a primary coil of the transformer.

Clause 5—The battery cell management circuit of any of clauses 1-4, wherein the battery cell management circuit further comprises a communication connection configured to operate according to a daisy chain protocol, wherein the communication connection connects the battery management circuit to other battery management circuits and to a receiver circuit associated with a processor, and wherein the processor is configured to control the DC/DC power converter.

Clause 6—The battery cell management circuit of any of clauses 1-5, wherein the battery cell management circuit is configured to: operate in a sleep mode; operate in a low power mode in a first instance of time following the sleep mode, wherein the battery cell management circuit receives first power from the first power supply in the first instance of time; and operate in a full power mode in a second instance of time following the first instance of time, wherein the battery cell management circuit receives second power from the second power supply in the second instance of time.

Clause 7—The battery cell management circuit of clause 6, wherein the battery cell management circuit is configured to: operate in the full power mode in response to a determination performed by the battery cell management circuit in the low power mode.

Clause 8—A circuit comprising: N battery cell management circuits configured to manage a plurality of battery cells, wherein N is an integer, wherein each of the N battery cell management circuits comprises a first connection to a first power supply, wherein the first power supply comprises the plurality of battery cells; a second power supply comprising a DC/DC power converter, wherein each of the N battery cell management circuits comprises a second connection to the second power supply; N rectifier circuits connected to the N battery cell management circuits; and a transformer that connects the DC/DC power converter to the N rectifier circuits, wherein the N battery cell management circuits are configured to receive power from the first power supply in a first instance of time and to receive power from the second power supply via the transformer and the N rectifier circuits in a second instance of time.

Clause 9—The circuit of clause 8, wherein the transformer comprises: a primary coil connected to the DC/DC power converter; and N secondary coils connected to the N rectifier circuits.

Clause 10—The circuit of clause 9, wherein the transformer comprises two or more planar coils formed on one or more PCBs.

Clause 11—The circuit of any of clauses 8-10, wherein N is greater than 10.

Clause 12—The circuit of any of clauses 8-11, wherein each of the N battery cell management circuits are configured to: operate in a sleep mode; operate in a low power mode in a first instance of time following the sleep mode, wherein each of the N battery cell management circuits receives first power from the first power supply in the first instance of time; and operate in a full power mode in a second instance of time following the first instance of time, wherein each of the N battery cell management circuits receives second power from the second power supply in the second instance of time.

Clause 13—The circuit of clause 12, wherein each of the N battery cell management circuits is configured to: operate in the full power mode in response to a determination by a respective one of the N battery cell management circuits in the low power mode.

Clause 14—A system comprising: a plurality of battery cells; N battery cell management circuits configured to manage the plurality of battery cells, wherein N is an integer, wherein each of the N battery cell management circuits comprises a first connection to a first power supply, wherein the first power supply comprises the plurality of battery cells; a second power supply comprising a DC/DC power converter, wherein each of the N battery cell management circuits comprises a second connection to the second power supply; N rectifier circuits connected to the N battery cell management circuits; a transformer that connects the DC/DC power converter to the N rectifier circuits, wherein the N battery cell management circuits are configured to receive power from the first power supply in a first instance of time and to receive power from the second power supply via the transformer and the N rectifier circuits in a second instance of time; and a controller circuit configured to control the DC/DC power converter.

Clause 15—The system of clause 14, wherein the N battery cell management circuits further comprise a communication connection configured to operate according to a daisy chain protocol, wherein the communication connection connects N battery management circuits in a daisy chain to the controller circuit, wherein the daisy chain comprises a ring network that includes the N battery management circuits and the controller circuit, wherein the controller circuit includes a receiver that is part of the ring network and a processor connected to the receiver, wherein the processor is configured to control the DC/DC power converter.

Clause 16—The system of clause 14 or 15, wherein the transformer comprises: a primary coil connected to the DC/DC power converter; and N secondary coils connected to the N rectifier circuits.

Clause 17—The system of clause 16, wherein the primary coil and the N secondary coils comprise two or more planar coils formed on one or more PCBs.

Clause 18—The system of any of clause 14-17, wherein for each of the N battery cell management circuits: the first connection receives first power from a linear regulator that regulates the first power supply; and the second connection receives second power from one of the N rectifier circuits connected to a secondary coil of the transformer, wherein the DC/DC power converter is connected to a primary coil of the transformer.

Clause 19—The system of any of clauses 14-18, wherein each of the N battery cell management circuits are configured to: operate in a sleep mode; operate in a low power mode in a first instance of time following the sleep mode, wherein each of the N battery cell management circuits receive first power from the first power supply in the first instance of time; and operate in a full power mode in a second instance of time following the first instance of time in response to a determination by a respective one of the N battery cell management circuits in the low power mode, wherein each of the N battery cell management circuits receive second power from the second power supply in the second instance of time.

Clause 20—A method of operating a battery management circuit of a battery management system associated with an electric device, the method comprising: supplying power to the battery management circuit from battery cells being monitored by the battery management circuit in a first instance of time; and suppling power to the battery management circuit from a DC/DC power converter in a second instance of time.

Clause 21—The method of clause 20, further comprising: operating the battery management circuit in a sleep mode; supplying power to the battery management circuit from battery cells being monitored by the battery management circuit in the first instance of time that corresponds to a low power mode following the sleep mode; checking one or more parameters of the battery cells in the low power mode; sending a wake-up signal from the battery management circuit to a controller circuit in response to a determination based on the one or more parameters of the battery cells in the low power mode; supplying power to the battery management circuit from the DC/DC power converter in the second instance of time that corresponds to a full power mode following the low power mode in response to the wake-up signal; and performing one or more battery cell management functions during the full power mode.

Various aspects and examples have been described in this disclosure. These and other aspects and examples are within the scope of the following claims.

The invention claimed is:

1. A battery cell management circuit configured to manage a plurality of battery cells, the battery cell management circuit comprising:

a first connection to a first power supply, wherein the first power supply comprises the plurality of battery cells; and a second connection to a second power supply, wherein the second power supply comprises a DC/DC power converter, wherein the battery cell management circuit is configured to:

operate in a sleep mode;

operate in a low power mode in a first instance of time following the sleep mode, wherein the battery cell management circuit receives first power from the first power supply in the first instance of time; and operate in a full power mode in a second instance of time following the first instance of time, wherein the battery cell management circuit receives second power from the second power supply in the second instance of time.

2. The battery cell management circuit of claim 1, wherein the first power supply and the second power supply comprise different power supply domains, wherein the first power supply comprises a high voltage power supply domain and the second power supply comprises a low voltage power supply domain, and wherein the low voltage power supply operates at a voltage level that is lower than that of the high voltage power supply.

3. The battery cell management circuit of claim 2, wherein the low voltage power supply domain and the high voltage power supply domain are galvanically isolated.

4. The battery cell management circuit of claim 1, wherein the battery cell management circuit is configured to:

operate in the full power mode in response to a determination performed by the battery cell management circuit in the low power mode.

5. A battery cell management circuit configured to manage a plurality of battery cells, the battery cell management circuit comprising:

a first connection to a first power supply, wherein the first power supply comprises the plurality of battery cells; and a second connection to a second power supply, wherein the second power supply comprises a DC/DC power converter, wherein the first connection receives first power from a linear regulator that regulates the first power supply; and wherein the second connection receives second power from a rectifier circuit connected to a secondary coil of a transformer, wherein the DC/DC power converter is connected to a primary coil of the transformer.

6. A battery cell management circuit configured to manage a plurality of battery cells, the battery cell management circuit comprising:

a first connection to a first power supply, wherein the first power supply comprises the plurality of battery cells; and a second connection to a second power supply, wherein the second power supply comprises a DC/DC power converter, wherein the battery cell management circuit further comprises a communication connection configured to operate according to a daisy chain protocol, wherein the communication connection connects the battery management circuit to other battery management circuits and to a receiver circuit associated with a processor, and wherein the processor is configured to control the DC/DC power converter.

7. A circuit comprising:
N battery cell management circuits configured to manage a plurality of battery cells, wherein Nis an integer, wherein each of the N battery cell management circuits comprises a first connection to a first power supply, wherein the first power supply comprises the plurality of battery cells;
a second power supply comprising a DC/DC power converter, wherein each of the N battery cell management circuits comprises a second connection to the second power supply;
N rectifier circuits connected to the N battery cell management circuits; and
a transformer that connects the DC/DC power converter to the N rectifier circuits, wherein the N battery cell management circuits are configured to receive power from the first power supply in a first instance of time and to receive power from the second power supply via the transformer and the N rectifier circuits in a second instance of time.

8. The circuit of claim 7, wherein the transformer comprises:
a primary coil connected to the DC/DC power converter; and
N secondary coils connected to the N rectifier circuits.

9. The circuit of claim 8, wherein the transformer comprises two or more planar coils formed on one or more printed circuit boards (PCBs).

10. The circuit of claim 7, wherein N is greater than 10.

11. The circuit of claim 7, wherein each of the N battery cell management circuits are configured to:
operate in a sleep mode;
operate in a low power mode in a first instance of time following the sleep mode, wherein each of the N battery cell management circuits receives first power from the first power supply in the first instance of time; and
operate in a full power mode in a second instance of time following the first instance of time, wherein each of the N battery cell management circuits receives second power from the second power supply in the second instance of time.

12. The circuit of claim 11, wherein each of the N battery cell management circuits is configured to:
operate in the full power mode in response to a determination by a respective one of the N battery cell management circuits in the low power mode.

13. A system comprising:
a plurality of battery cells;
N battery cell management circuits configured to manage the plurality of battery cells, wherein Nis an integer, wherein each of the N battery cell management circuits comprises a first connection to a first power supply, wherein the first power supply comprises the plurality of battery cells;
a second power supply comprising a DC/DC power converter, wherein each of the N battery cell management circuits comprises a second connection to the second power supply;
N rectifier circuits connected to the N battery cell management circuits;
a transformer that connects the DC/DC power converter to the N rectifier circuits, wherein the N battery cell management circuits are configured to receive power from the first power supply in a first instance of time and to receive power from the second power supply via the transformer and the N rectifier circuits in a second instance of time; and
a controller circuit configured to control the DC/DC power converter.

14. The system of claim 13, wherein the N battery cell management circuits further comprise a communication connection configured to operate according to a daisy chain protocol, wherein the communication connection connects N battery management circuits in a daisy chain to the controller circuit, wherein the daisy chain comprises a ring network that includes the N battery management circuits and the controller circuit, wherein the controller circuit includes a receiver that is part of the ring network and a processor connected to the receiver, wherein the processor is configured to control the DC/DC power converter.

15. The system of claim 13, wherein the transformer comprises:
a primary coil connected to the DC/DC power converter; and
N secondary coils connected to the N rectifier circuits.

16. The system of claim 15, wherein the primary coil and the N secondary coils comprise two or more planar coils formed on one or more printed circuit boards (PCBs).

17. The system of claim 13, wherein for each of the N battery cell management circuits:
the first connection receives first power from a linear regulator that regulates the first power supply; and
the second connection receives second power from one of the N rectifier circuits connected to a secondary coil of the transformer, wherein the DC/DC power converter is connected to a primary coil of the transformer.

18. The system of claim 13, wherein each of the N battery cell management circuits are configured to:
operate in a sleep mode;
operate in a low power mode in a first instance of time following the sleep mode, wherein each of the N battery cell management circuits receive first power from the first power supply in the first instance of time; and
operate in a full power mode in a second instance of time following the first instance of time in response to a determination by a respective one of the N battery cell management circuits in the low power mode, wherein each of the N battery cell management circuits receive second power from the second power supply in the second instance of time.

19. A method of operating a battery management circuit of a battery management system associated with an electric device, the method comprising:
supplying power to the battery management circuit from battery cells being monitored by the battery management circuit in a first instance of time;
supplying power to the battery management circuit from a DC/DC power converter in a second instance of time;
operating the battery management circuit in a sleep mode;
supplying power to the battery management circuit from battery cells being monitored by the battery management circuit in the first instance of time that corresponds to a low power mode following the sleep mode;
checking one or more parameters of the battery cells in the low power mode;

sending a wake-up signal from the battery management circuit to a controller circuit in response to a determination based on the one or more parameters of the battery cells in the low power mode;

supplying power to the battery management circuit from the DC/DC power converter in the second instance of time that corresponds to a full power mode following the low power mode in response to the wake-up signal; and performing one or more battery cell management functions during the full power mode.

* * * * *